United States Patent [19]

Kern, Jr.

[11] Patent Number: 4,875,794
[45] Date of Patent: Oct. 24, 1989

[54] PRELOADED STEERING BALL JOINT ASSEMBLY AND METHOD

[75] Inventor: Karle O. Kern, Jr., Reminderville, Ohio

[73] Assignee: Dana Corporation, Toledo, Ohio

[21] Appl. No.: 137,393

[22] Filed: Dec. 23, 1987

[51] Int. Cl.[4] .............................................. F16C 11/06
[52] U.S. Cl. .................................... 403/132; 403/138; 403/140; 403/269; 403/137; 29/149.5 B
[58] Field of Search ............... 403/132, 133, 138, 137, 403/144, 140, 34, 36, 135, 136, 143, 122, 265, 268, 269; 29/149.5 B, 149.5 NM, 436; 264/242, 264

[56] References Cited

U.S. PATENT DOCUMENTS

| | | | |
|---|---|---|---|
| 2,954,992 | 10/1960 | Baker | 403/140 |
| 3,178,209 | 4/1965 | Gottschald | 403/139 |
| 3,389,925 | 6/1968 | Gottschald | 403/36 |
| 3,486,778 | 12/1969 | Herbenar et al. | 403/140 |
| 3,677,585 | 7/1972 | Schearer | 403/140 |
| 3,849,010 | 11/1974 | Herbenar | 403/138 |
| 3,857,149 | 12/1974 | Hassan | 29/149.5 B |
| 3,969,030 | 7/1976 | Sullivan | 403/132 |
| 3,999,870 | 12/1976 | Clark et al. | 403/132 X |
| 4,003,667 | 1/1977 | Gaines et al. | 403/132 X |
| 4,259,027 | 3/1981 | Hata | 403/138 X |
| 4,290,181 | 9/1981 | Jackson | 29/149.5 B X |
| 4,358,211 | 11/1982 | Goodrich, Jr. et al. | 403/132 X |
| 4,629,352 | 12/1986 | Nemoto | 403/132 X |

FOREIGN PATENT DOCUMENTS 1398106 11/1975 United Kingdom ................ 403/132

Primary Examiner—Andrew V. Kundrat
Assistant Examiner—Peter M. Cuomo
Attorney, Agent, or Firm—F. B. McDonald

[57] ABSTRACT

A preloaded steering ball joint assembly provides a system wherein relatively constant torque may be realized over the useful life of the joint. In a preferred form, the joint assembly includes a housing having a ball socket cavity, and a ball and a shaft integral with the ball. Top and bottom bearing seats are disposed for positioning and retaining the ball within the housing. The bottom seat includes an aperture for permitting passage of the shaft, while the top seat includes both an aperture as well as radial passageways for permitting access of lubricant into a lubricant chamber portion of the socket cavity. A preferred method of manufacture includes insert molding an elastomer disc over the top bearing seat by a pre-measured amount of overfill, then after its formation compressing the elastomer disc by means of a second disc made of metal by peening the latter metallic disc over the elastomer disc. The metallic disc is utilized to compress the predetermined "overfill" of elastomer, which provides a mechanism by which consistency of torque preload may be achieved in spite of tolerance variations in part dimensions. Also, the top seat includes a barrier lip which extends circumferentially about its upper surface for preventing leakage of molten elastomer into the lubricant chamber during the insert molding process.

9 Claims, 1 Drawing Sheet

PRELOADED STEERING BALL JOINT ASSEMBLY AND METHOD

BACKGROUND OF THE INVENTION

This invention relates to vehicular steering ball joint assemblies. More particularly, the invention relates to the preloading of such assemblies for achieving relatively constant torques on the ball joints over the useful lives of such joints.

A major requirement of ball joints as utilized in steering links and suspension systems is the maintenance of a relatively constant rotating torque over the useful life of the joint. Normally, as the useful life progresses, the rotating torque decreases and steering wheel play and oscillations tend to increase to the detriment of vehicular operation. Attempts to overcome such undesirable torque loss are numerous. For example, coil springs have been employed within the ball socket cavities of joint assemblies to urge bearing members constantly against the ball. Typically, however, the coil spring has a low compressive longitudinal elastic modulus, and the torques consequently cannot be set sufficiently high enough to meet desired values. Not only is there a large reduction of bearing contact load under small changes in part dimensions due to general wear and abrasion, but in the process of manufacture there often results a large deviation in initially set rotating torque values. As a result, ball joints are rarely manufactured with satisfactory consistency in preload torque values.

Moreover, elastomer members formed under injection or insert molding techniques have also been substituted for coil springs to compensate for the small compressive longitudinal elastic modulus of coil springs. However, although the use of elastomer has provided some improvement, manufacturing techniques for achieving consistency in torque values, regardless of tolerance variations in part sizes, have not yet been satisfactory.

SUMMARY OF THE INVENTION

The preloaded steering ball joint assembly and method of the present invention provides a system wherein a relatively consistent torque value may be achieved in spite of fairly wide tolerance variations in dimensions of parts. In a preferred form, a preloaded ball joint assembly is formed which utilizes an elastomer disc formed by an insert molding process, instead of using a coil spring for preloading the upper or top bearing seat of the joint assembly. In a preferred form, the joint assembly includes ball socket and integral ball-shaft members with upper and lower semi-spherical bearing seats for positioning and retaining the ball within the socket cavity. However, the top seat contains an integral circumferentially extending barrier lip which, during the insert molding process, prevents the flow of molten elastomer from entering the ball socket cavity. The lip is angled radially outwardly toward the elastomer disc so that as the pressure increases during the insert molding process the lip will expand outwardly against the socket cavity wall. Ideally, the greater the pressure the greater the tendency for the lip to so accommodate the pressure. Under a preferred method, the elastomer is insert molded into the cavity to a predetermined overfill dimension which extends above an internal circumferential shoulder. A metallic disc is installed atop the elastomer disc to compress the elastomer disc against the top seat. A peening process is utilized to force the metallic disc downwardly so as to cause the disc to bottom against the shoulder and to thereby compress the elastomer by the predetermined dimension to effect desired torque preload of the ball between the bearing seats.

A BRIEF DESCRIPTION OF THE DRAWINGS

DETAILED DESCRIPTION OF A PREFERRED EMBODIMENT

Figure 1:
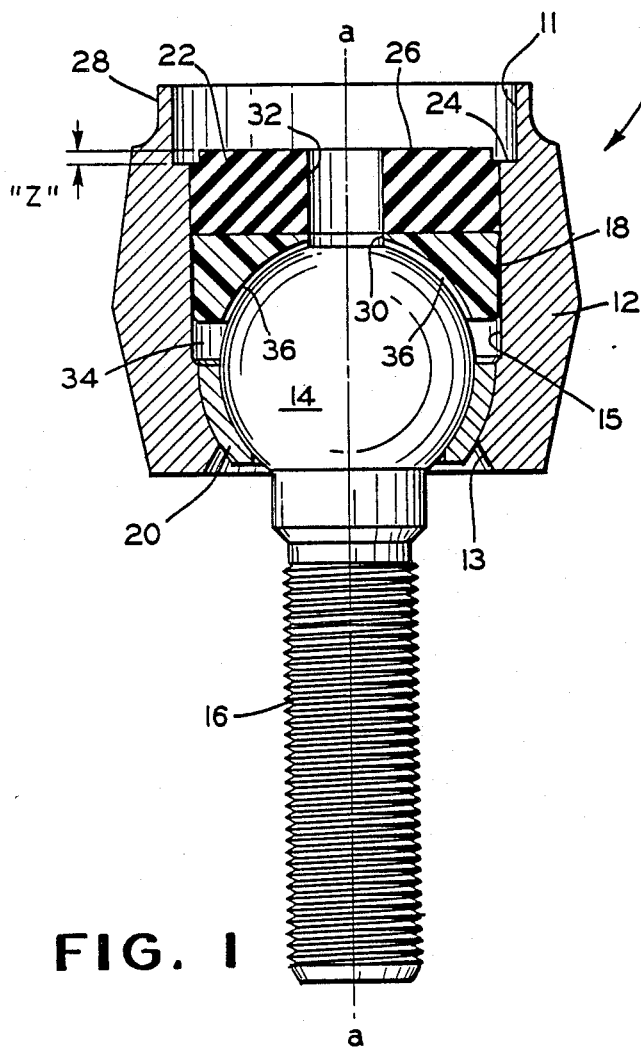
FIG. 1 is a cross sectional view of a preferred embodiment of the steering ball joint assembly of the present invention, shown during one stage of its manufacturing process.

Referring initially to FIG. 1, a partially completed ball joint assembly 10 describes a longitudinal axis "a-a" about which a cylindrical housing 12 defines upper and lower openings 11 and 13, respectively. The housing is adapted for containment and dynamic retension of a ball 14 which has an integrally fixed shaft 16 extending therefrom. The interior of the housing 12 defines a ball socket cavity 15 which contains an upper or top bearing seat 18 and an opposed lower or bottom bearing seat 20. Each seat defines a semi-spherical member adapted to opposingly seat the ball 14 within the housing 12, as shown.

For purposes of preloading the ball 14 between the pair of bearing seats 18 and 20, an elastomer disc 22 is juxtaposed under force against the top bearing seat 18. In the invention as described herein, the elastomer disc is formed by an insert molding process which is designed to accommodate a variation of tolerance in dimensions of the housing, ball, and bearing members. The invention provides a method wherein molten elastomer is insert molded into that portion of the cavity 15 which is above the top bearing seat 18 by an amount which slightly overfills a circumferential shoulder 24 within the cavity. Hence, the top of the disc 26 upon completion of the insert molding process will be positioned above the shoulder 24 by a carefully predetermined amount of elastomer, indicated as "z" in FIG. 1.

Figure 5:
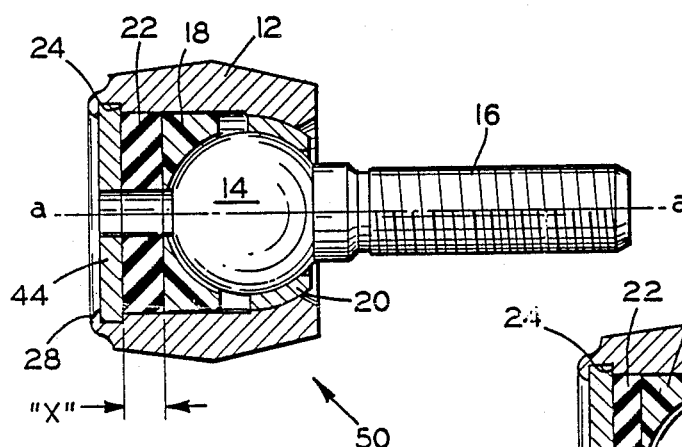
FIG. 5 is a cross sectional view of a completed steering ball joint assembly constructed in accordance with a preferred process of the present invention, shown with tolerance variations of assembly parts at a maximum accumulation.
Figure 6:
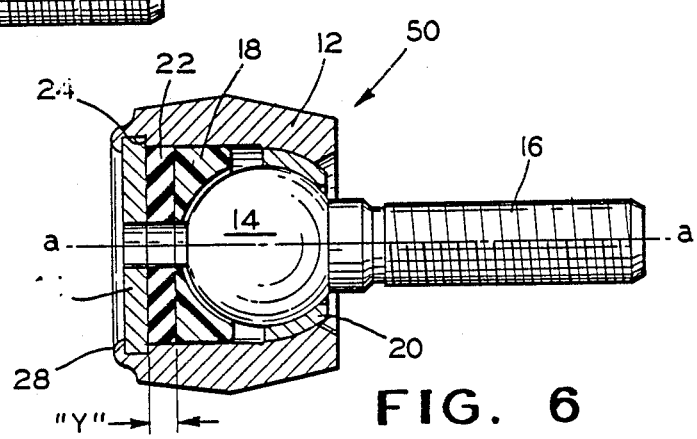
FIG. 6 is a completed assembly view similar to that of FIG. 5, except that tolerance variations of assembly parts are at their minimum accumulation value.

Referring now to FIGS. 5 and 6, a completed ball joint assembly 50 is shown which includes a metallic disc 44. Referring momentarily back to FIG. 1, it will be seen that a circumferential closure lip 28 which defines the extremity of the upper opening 11 of the housing 12 will, in the final completed assembly 50, be peened over the disc 44 to thereby compress the elastomer disc 22 by the amount equal to the "z" overfill dimension. The edges of the disc 44 will fully engage the shoulder 24 upon the peening of the closure lip 28 down over the disc.

A maximum tolerance condition is shown in FIG. 5. Those skilled in the art will appreciate that this condition will produce the largest possible disc thickness, represented as "x". By contrast, FIG. 6 shows a completed assembly 50 in which the tolerance variation brings about the minimum elastomer disc thickness, represented as "v". In the embodiments of FIGS. 5 and 6, the difference in the "x" and "y" dimensions, that is, "x" minus "y", was in he range of 70–80 thousandths of an inch, while the "z" dimension was approximately 40 thousandths of an inch. The "z" dimension reflects the amount of overfill which for preload torque consistency would be a constant value in a given ball joint assembly manufacturing process. Moreover, the "z" dimension in the preferred practice of the invention will vary only by one plus or minus five thousandths of an inch. In the embodiment herein described, preload pressure ranges fell between 15 to 50 inch-pounds of torque. The elastomer disc was insert molded, and had a durometer value of approximately 52.

In the preferred form, the top bearing seat 18 can be formed either of a polyacetal material or of a teflon filled plastic, although other low friction surface materials may be utilized. For example, the bottom seat 20 was of a polished steel for reasons of minimizing fertilizer corrosion in the embodiment described.

Referring now to FIG. 1, it will be appreciated by those skilled in the art that the ball joint assembly of the present invention must be able to receive and to accommodate lubrication over its useful life. For this purpose, a pair of communicating lubrication channels 30 and 32 extend through the top bearing seat 18 and the elastomer disc 22, respectively (see FIG. 1). The channels permit lubricant entry into a socket cavity lubrication or lubricant chamber 34, defined by the annular spacing or gap between the upper and lower bearing seats 18 and 20. A plurality of radial lubrication passageways 36 extends through the bottom face 38 of the top bearing seat 18 (FIG. 4) to allow passage of lubricant from the channels 32 and 30 into the chamber 34. As apparent in FIG. 1, the passageways 36 are concave to the extent that they follow the surface contour of the ball 14.

Figure 2:
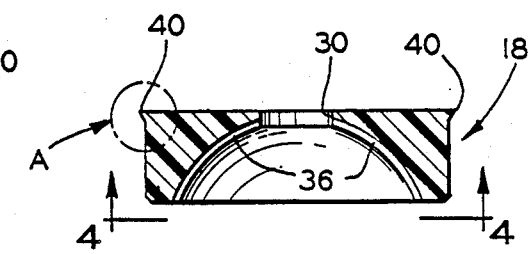
FIG. 2 is a cross sectional side view of the top bearing seat in the embodiment of FIG. 1.
Figure 3:
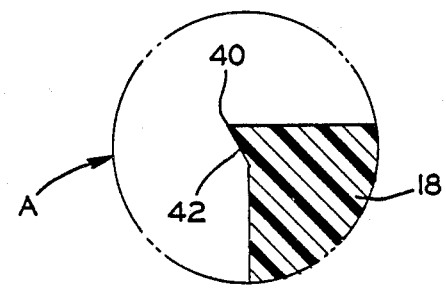
FIG. 3 is an enlarged view of a circled portion "A" of FIG. 2.
Figure 4:
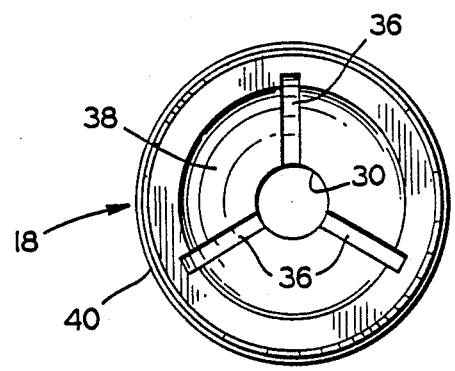
FIG. 4 is a bottom face view of the top bearing seat, viewed along lines 4—4 of FIG. 2.

Referring to FIGS. 2–4, it will also be appreciated by those skilled in the art that the top bearing seat 18 includes another feature which will avoid entry of molten elastomer into the socket chamber 34 during insert molding of the elastomer disc 22. Thus, the top bearing seat 18 contains a circumferentially extending barrier lip 40 more clearly seen in the enlarged view of FIG. 3. The lip includes an angled sidewall 42 which extends in a direction toward the elastomer disc 22, and operates to insure that the lip 40 will, under pressure of the molten elastomer, expand radially outwardly against the internal wall of the ball socket cavity 15.

Finally, it will be further appreciated by those skilled in the art that any die (none is shown) used for the insert molding process will preferably define a "plug" portion, which during the insert molding process will extend down into the lubrication channel 30 in the top bearing seat and against the top of the ball 14 in order to keep the finished elastomer disc from plugging the channel 30. Such plug portion of the die will also have the effect of forming the lubrication channel 32 in the elastomer disc 22 during the insert molding process.

Although only one preferred embodiment has been detailed and described herein, the following claims envision numerous other embodiments which will fall within the spirit and scope thereof.

What is claimed is:

1. In a preloaded ball joint assembly adapted for use in a vehicular sterring link, said joint assembly including a ball and a shaft integrally fixed to said ball, a ball housing defining a longitudinal axis, said housing having first and second openings aligned with said axis, said first opening containing a circumferential housing lip, said first opening also containing an internal circumferentially extending shoulder adjacent said lip circumferential housing said second opening defining a passageway for said shaft, said housing defining an internal ball socket cavity containing first and second opposed bearing seats defining a lubrication chamber therebetween and about said ball, each bearing seat comprising a semispherical member formed of a low surface friction material, said second bearing seat containing an opening for passage of said shaft, said second bearing seat being positioned against said second opening of said housing to accommodate said shaft, said ball socket cavity containing a metal disc and a compressed elastomer disc juxtaposed against said metal disc, said elastomer disc being urged against the first bearing seat by said metal disc, said metal disc retained tightly against said compressed elastomer disc by said circumferential housing lip; an improvement comprising in combination (1) said elastomer disc being formed in-situ by insert molding, wherein molten elastomer is forced into said socket cavity, and (2) said first bearing seat being formed with a circumferential barrier lip which is dimensioned for an interference fit with said ball socket cavity, said circumferential barrier lip comprising an angled side wall extending in a direction toward said elastomer disc, said circumferential barrier lip adapted for expanding radially outwardly against said socket cavity under pressure of said molten elastomer, whereby during insert molding of said elastomer disc, said circumferential barrier lip is effective to prevent entry of molten elastomer into said lubrication chamber.

2. The preloaded ball joint assembly of claim 1 wherein said first bearing seat is formed of a polyacetal material.

3. The preloaded ball joint assembly of claim 2 further comprising a pair of lubrication channels oriented along said longitudinal axis of said housing, one channel extending through said elastomer disc and the second channel extending through said first bearing seat, said channels being in communication with each other.

4. The preloaded ball joint assembly of claim 3 wherein said lubrication chamber within said socket cavity is defined by a circumferentially extending gap about said ball between said first and second bearing seats.

5. The preloaded ball joint assembly of claim 4 wherein said first bearing seat comprises a plurality of radially extending passageways extending between said second lubrication channel and said lubrication chamber.

6. The preloaded ball joint assembly of claim 5 wherein said second seat is formed of a corrosion resistant metallic material.

7. A method of making a preloaded ball joint assembly adapted for use in a vehicular steering link, said joint assembly including a ball, a shaft integrally fixed to said ball, a ball housing defining a longitudinal axis, said housing having first and second openings aligned with said axis, the first opening containing a circumferential housing lip and an internal circumferentially extending shoulder adjacent said circumferential housing lip, said second opening defining a passageway for said shaft, said housing further defining an internal ball socket cavity containing first and second opposed bearing seats positioned within said cavity against portions of said ball, each bearing seat comprising a semi-spherical member of a low surface friction material, said second of said bearing seats containing an opening for said shaft and being positioned against said second opening of said housing to accommodate passage of said shaft, a compressed elastomer disc being urged tightly against said first bearing seat, a metallic disc being urged against said elastomer disc and retained tightly thereagainst by said circumferential housing lip; said method comprising the steps of:
- (a) inserting said second bearing seat containing said opening within said housing in a manner such that said bearing seat opening is aligned with said second opening of said housing,
- (b) inserting said integral ball and shaft member into said housing by first inserting the shaft portion thereof through said first and then said second of said housing openings, in that order,
- (c) inserting said first bearing seat being formed with a circumferential barrier lip having an angled side wall through said first housing opening against said ball, said circumferential barrier lip being dimensioned for an interference fit with said ball socket cavity
- (d) insert molding an elastomer disc into said first housing opening against said first bearing seat by filling said housing cavity with molten elastomer under pressure to a predetermined overfill dimension defined by a pre-measured distance which falls between the extremity of said circumferential housing lip and said shoulder.
- (e) installing said metallic disc against said elastomer disc after the formation of said elastomer disc, and,
- (f) peening said circumferential housing lip to cause said metallic disc to fully engage said shoulder, thereby compressing said elastomer disc by said predetermined overfill dimension to effect a desired preloading of said ball between said bearing seats.

8. The method of claim 7 wherein said predetermined overfill dimension falls within a range of 30–50 thousandths of an inch.

9. The method of claim 8 wherein said first bearing seat is comprised of a polyacetal material.

* * * * *